United States Patent
Miller et al.

(10) Patent No.: US 7,143,273 B2
(45) Date of Patent: Nov. 28, 2006

(54) METHOD AND APPARATUS FOR DYNAMIC BRANCH PREDICTION UTILIZING MULTIPLE STEW ALGORITHMS FOR INDEXING A GLOBAL HISTORY

(75) Inventors: John Alan Miller, Portland, OR (US); Slade A. Morgan, Forest Grove, OR (US); Stephan J. Jourdan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 560 days.

(21) Appl. No.: 10/404,812

(22) Filed: Mar. 31, 2003

(65) Prior Publication Data

US 2004/0193857 A1   Sep. 30, 2004

(51) Int. Cl.
G06F 9/32 (2006.01)
(52) U.S. Cl. ............... 712/240; 712/239; 712/233
(58) Field of Classification Search ............... 712/240, 712/239
See application file for complete search history.

(56) References Cited

U.S. PATENT DOCUMENTS

| | | | |
|---|---|---|---|
| 5,758,142 A * | 5/1998 | McFarling et al. ......... 712/239 |
| 5,881,277 A * | 3/1999 | Bondi et al. ............... 712/239 |
| 6,055,630 A | 4/2000 | D'Sa et al. |
| 6,272,623 B1 * | 8/2001 | Talcott ...................... 712/239 |
| 6,438,673 B1 | 8/2002 | Jourdan et al. |
| 6,516,405 B1 | 2/2003 | Jourdan et al. |
| 6,560,690 B1 | 5/2003 | Hum et al. |
| 6,675,280 B1 | 1/2004 | Cooksey et al. |
| 6,675,282 B1 | 1/2004 | Hum et al. |
| 6,701,426 B1 * | 3/2004 | Ries et al. .................. 712/239 |
| 6,715,064 B1 * | 3/2004 | D'Sa et al. ................ 712/240 |
| 6,721,877 B1 * | 4/2004 | Chen et al. ................ 712/239 |
| 6,742,112 B1 | 5/2004 | Yoaz et al. |
| 6,842,842 B1 | 1/2005 | Svendsen et al. |
| 6,848,031 B1 | 1/2005 | Jourdan |
| 6,950,924 B1 | 9/2005 | Miller et al. |
| 6,954,840 B1 | 10/2005 | Cooksey et al. |
| 6,990,551 B1 | 1/2006 | Hum et al. |
| 7,017,026 B1 | 3/2006 | Yoaz et al. |
| 2001/0056531 A1 * | 12/2001 | McFarling ................. 712/239 |
| 2002/0078327 A1 | 6/2002 | Jourdan et al. |
| 2002/0087850 A1 | 7/2002 | Jourdan et al. |
| 2002/0087852 A1 | 7/2002 | Jourdan et al. |
| 2003/0065909 A1 | 4/2003 | Jourdan |
| 2003/0065912 A1 | 4/2003 | Hum et al. |
| 2003/0105939 A1 | 6/2003 | Cooksey et al. |
| 2003/0105940 A1 | 6/2003 | Cooksey et al. |
| 2003/0154362 A1 | 8/2003 | Jourdan et al. |
| 2003/0191893 A1 | 10/2003 | Miller et al. |
| 2003/0217251 A1 | 11/2003 | Jourdan et al. |

(Continued)

OTHER PUBLICATIONS

Combining Branch Predictors, Scott McFarling, Jun. 1993, WRL-Technical Note TN-36.*

(Continued)

Primary Examiner—Eddie Chan
Assistant Examiner—George D. Zalepa
(74) Attorney, Agent, or Firm—Ram P. Yadav (57) ABSTRACT

Toggling between accessing an entry in a global history with a stew created from branch predictions implied by the ordering of instructions within a trace of a trace cache when a trace is read out of a trace cache, and accessing an entry in a global history with repeatable variations of a stew when there is more than branch instruction within a trace within the trace cache and at least a second branch instruction is read out.

19 Claims, 4 Drawing Sheets

U.S. PATENT DOCUMENTS

| | | |
|---|---|---|
| 2004/0193857 A1 | 9/2004 | Miller et al. |
| 2005/0014969 A1 | 1/2005 | Uematsu et al. |
| 2005/0071614 A1 | 3/2005 | Jourdan et al. |
| 2005/0132174 A1 | 6/2005 | Jourdan et al. |
| 2005/0138295 A1 | 6/2005 | Hammarlund et al. |
| 2005/0138338 A1 | 6/2005 | Sodani et al. |
| 2005/0138341 A1 | 6/2005 | Maiyuran et al. |
| 2005/0147036 A1 | 7/2005 | Hammarlund et al. |
| 2005/0149680 A1 | 7/2005 | Jourdan et al. |
| 2005/0149707 A1 | 7/2005 | Jourdan et al. |
| 2005/0149709 A1 | 7/2005 | Jourdan et al. |
| 2005/0149912 A1 | 7/2005 | Farcy et al. |
| 2005/0289324 A1 | 12/2005 | Miller et al. |

OTHER PUBLICATIONS

Q. Jacobson, E. Rothenberg and J.E. Smith. Path-based next trace prediction. Proceedings of the 30th International Symposium on Microarchitecture, 1997.*

Structured Computer Organization, Andrew S. Tanenbaum, 1984, Prentice-Hall, Inc., 2nd Edition, pp. 10-11.*

U.S. Appl. No. 11/315,964, filed Dec. 21, 2005.

U.S. Appl. No. 09/608,624, filed Jun. 30, 2000.

U.S. Appl. No. 09/608,512, filed Jun. 30, 2000.

* cited by examiner

METHOD AND APPARATUS FOR DYNAMIC BRANCH PREDICTION UTILIZING MULTIPLE STEW ALGORITHMS FOR INDEXING A GLOBAL HISTORY

ART BACKGROUND

As part of continuing efforts to increase the performance of central processing units (CPUs) instruction-level parallelism has been increasingly employed, in part, by deepening instruction pipelines. However, one consequence of a deeper pipeline is greater susceptibility to losses in performance from having to flush instructions being processed in the pipeline (i.e., instructions that are "in flight" in the pipeline).

Countering this deleterious effect of branch instructions on deeper pipelines is the use of branch prediction algorithms meant to determine whether or not a branch will be taken, and to then cause the pre-fetching of an appropriate set of instructions based on that prediction into the pipeline. However, as pipelines become ever deeper, the stakes of lost performance due to a misprediction become ever greater, and so the accuracy of branch prediction becomes ever more important.

BRIEF DESCRIPTION OF THE DRAWINGS

The objects, features, and advantages of the invention as hereinafter claimed will be apparent to one skilled in the art in view of the following detailed description in which:

DETAILED DESCRIPTION

Although numerous details are set forth for purposes of explanation and to provide a thorough understanding in the following description, it will be apparent to those skilled in the art that these specific details are not required in order to practice embodiments of the invention as hereinafter claimed.

A method and apparatus for improving the accuracy of branch prediction is disclosed. Specifically, an algorithm for branch prediction and apparatus implementing that algorithm are disclosed in which a trace cache and a combination of static and dynamic branch prediction techniques are employed. Although the discussion is largely centered on a CPU for use in a general purpose computer system, it will be understood by those skilled in the art that the invention as hereinafter claimed is applicable to a wide variety of electronic devices used for a wide variety of purposes.

Figure 1:
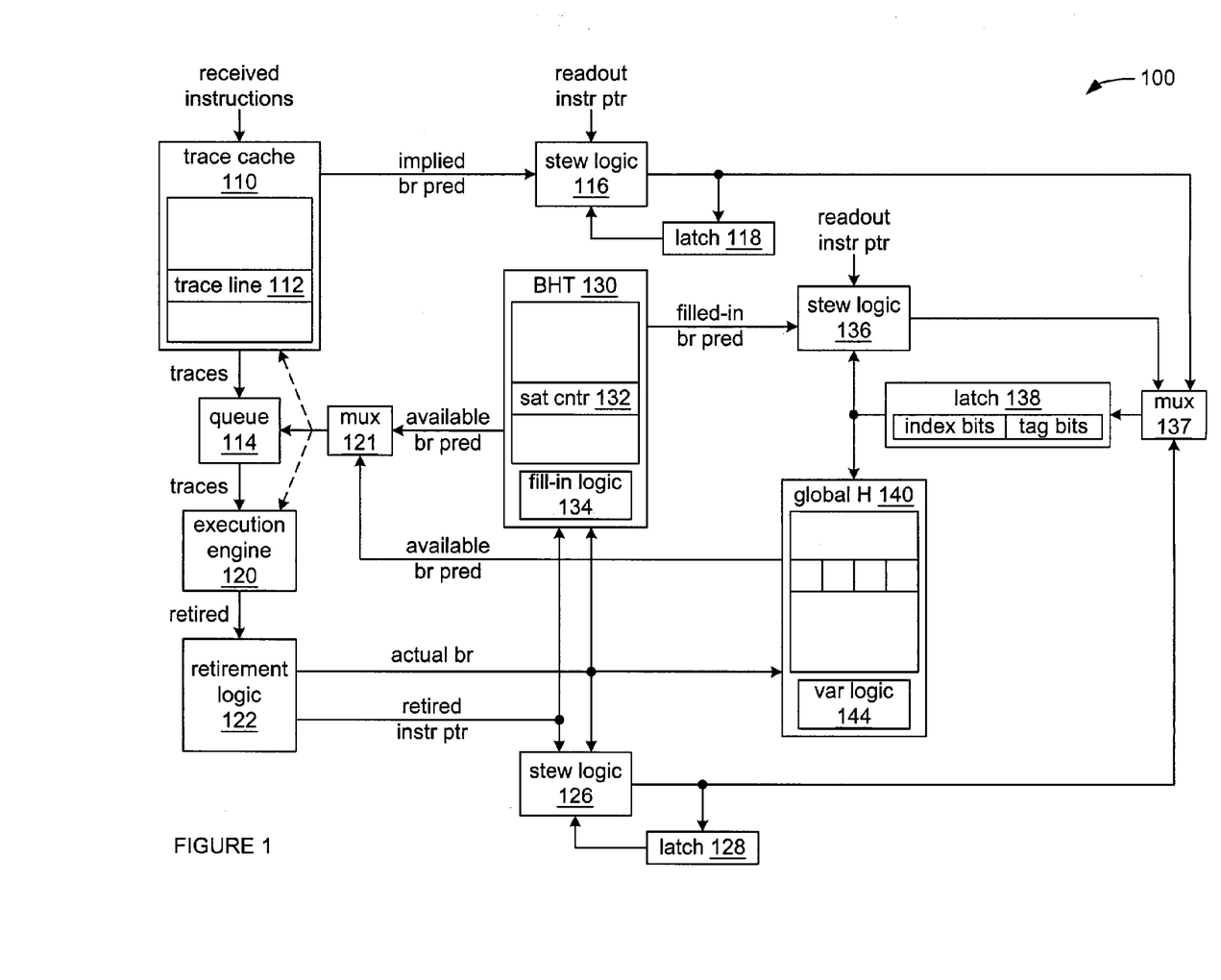
FIG. 1 depicts an embodiment of CPU logic.

FIG. 1 depicts an embodiment of central processing unit (CPU) logic. CPU logic 100 is made up of trace cache 110, queue 114, stew logic 116, latch 118, execution engine 120, multiplexer 121, retirement logic 122, stew logic 126, latch 128, branch history table (BHT) 130, stew logic 136, multiplexer 137, latch 138 and global history 140. These parts of CPU logic 100 cooperate together to execute instructions making up pieces of software, however, the depiction of these parts of CPU logic 100 and their description in the text that follows should not be construed as an indication that these are the only parts making up CPU logic 100, or that one or more of these parts could not be rearranged, combined or substituted with other parts without departing from the spirit and scope of the invention as hereinafter claimed.

Trace cache 110 receives instructions organized into groups of instructions called traces from other logic (not shown) that is external to CPU logic 100. Traces are groups of instructions assembled together in the order in which it is predicted that they will be needed for execution by a CPU. This necessarily means that this order in which these instructions are assembled together creates implicit predictions as to whether or not each of the branches will be taken or not taken when encountered. These traces are each stored within one or more trace lines, such as trace line 112, within trace cache 110, and the instructions are normally read out of trace cache 110 in the order in which they are organized within the traces through queue 114 and to execution engine 120 for execution. As this reading out of traces of instructions to execution engine 120 occurs, indications of whether each branch is impliedly predicted to be taken or not taken is supplied to stew logic 116.

Execution engine 120 receives and executes instructions organized in traces received from trace cache 110 and through queue 114. Execution engine 120 is made up of one or more portions of logic, including, but not limited to arithmetic logic units (commonly referred to as ALUs), floating-point arithmetic units (commonly referred to as FPUs), processing units for single-instruction-multiple-data (SIMD) operations, load/store processing units, etc. Execution engine 120 also receives other predictions of whether branches will be taken or not taken that might necessitate a change in the order of execution of instructions from the order dictated by the implied predictions of the traces through multiplexer 121 and/or queue 114, as will be discussed, shortly. To further speed the execution of instructions in some embodiments, execution engine 120 may be designed to execute instructions out of the order in which they are received (often called "out-of-order" execution) in an effort to continue the execution of at least some instructions at times when the execution of other instructions cannot proceed (i.e., when other instructions are "stalled") due to dependencies on the results of the execution of other instructions or on waiting to receive data that must be retrieved from outside CPU logic 100, etc.

Presuming that instructions are being executed out-of-order by execution engine 120, indications of the results are output to retirement logic 122 where they are put back into order. Within retirement logic 122 interdependencies are resolved and each instruction is held until all preceding instructions have been executed, and then the instructions are finally "retired" in their proper order. Retirement logic 122 supplies indications of the actual path of execution followed through the instructions by execution engine 120, including indications of where branches were taken or not taken in instances that differed from the implied predictions embedded within the traces held within trace cache 110. These indications of whether branches were actually taken or not taken are sent to stew logic 126 and branch history table (BHT) 130 along with instruction pointers (i.e., the indices pointing to locations within trace cache 110). Indications of whether branches were actually taken or not taken are also sent to global history 140. If out-of-order execution does not occur within execution engine 120, then in other embodiments retirement logic 122 may not be present, and the indications of the actual taking of branches may be provided to other parts of CPU logic 100 by execution engine 120, directly.

BHT 130 receives indications of whether branches were actually taken or not taken as a result of the actual path of execution and the instruction pointers of those retired branches. Like the entries for individual instructions within trace cache 110 are indexed with an instruction pointer, the entries for the histories of individual branch instructions are also indexed with an instruction pointer. In some possible embodiments, BHT 130 may be an array with a number of index-accessible entries of equal quantity and having 1:1 correspondence with the entries of trace cache 110. However, this can be a very inefficient use of available electronic circuitry since not all instructions within trace cache 110 are likely to be branch instructions, and therefore, many of such entries within BHT 130 would not be used. Therefore, in other embodiments, an opportunity to reduce resources (such as quantity of gates and/or transistors) required by BHT 130 is taken by designing BHT 130 to have fewer entries than trace cache 110, and to use a tag mechanism to allocate a smaller number of entries for only branch instructions, with at least a subset of the bits of an instruction pointer being used as tag bits. To further conserve resources in some embodiments, BHT 130 may be configured to be large enough only to reasonably accommodate a number of entries corresponding only to those branches within trace cache 110 for which the implied predictions were found to be mispredictions as a result of whether branches were found to actually be taken or not taken during execution. In other words, in such embodiments, BHT 130 stores only "exceptions" or "corrections" to the implied predictions arising from the order of instructions within the traces from trace cache 110 where, in effect, branches were taken or not taken in instances that caused execution to depart from the order of instructions in a given trace, rather than follow that trace. In other words, entries are created in BHT for branches where a "trace-leave" occurred during actual execution of those branches.

Depending on the embodiment, BHT 130 may have entries designed in accordance with any of a number of various algorithms of dynamic branch prediction known to those skilled in the art branch prediction. In some embodiments, the entries may be at least partly made up of 2-bit saturating counters operating in a manner not unlike the classic "Lee & Smith" algorithm for 2-bit counters used to provide per-branch dynamic branch predictions with hysteresis incorporated to compensate for prediction errors that might otherwise be introduced by loops in which branches are used to control the number of times a loop is executed.

Global history 140 receives indications of how branches were actually taken or not taken as a result of actual paths of execution, and stores patterns of branches taken and branches not taken. These patterns are indexed by way of the outputs of stew logic 116, 126 and 136. Stew logic 116, 126 and 136 may implement any one of a number of "stew" algorithms known to those skilled in the art of 2-level branch prediction using per-branch branch pattern histories. Regardless of what stew algorithm(s) are employed by stew logic 116, 126 and 136, the stew outputs of all three of stew logic 116, 126 and 136 are presented to the inputs of multiplexer 137 which supplies a different one of these three different stew outputs to latch 138 depending on various conditions to be discussed, shortly.

In some embodiments, the stew algorithm employed by stew logic 116, 126 and 136 could entail concatenating bits holding the previous stew output with a bit representing a new piece of branch history or branch prediction, dropping the bit representing the oldest piece of branch history, and then XORing the concatenated bits with the instruction pointer of a given branch to produce a new stew output. In these embodiments, stew logic 116 would concatenate its previous stew output (stored in latch 118) with a bit representing an implied prediction for a branch instruction being read out of trace cache 110 to execution engine 120, drop the bit corresponding to the oldest history from the previous stew output, and XOR the concatenated bits with the instruction pointer for the branch instruction being read out. In these embodiments, stew logic 126 would concatenate its previous stew output (stored in latch 128) with a bit representing the actual direction in which a branch executed by execution engine 120 was taken, drop the bit corresponding to the oldest history from the previous stew output, and XOR the concatenated bits with the instruction pointer for that branch executed by execution engine 120. In these embodiments, stew logic 136 would concatenate its previous stew output (stored in latch 138) with a bit representing a prediction from BHT 130, drop the bit corresponding to the oldest history from the previous stew output, and XOR the concatenated bits with the instruction pointer for a branch instruction being read out.

In normal operation, when a branch instruction is read out from trace cache 110 to execution engine 120, the same instruction pointer used in reading out that branch instruction is also used to query BHT 130 for the presence or absence of a prediction that supplies a correction or exception to the implied, prediction of the trace of which that branch instruction is a part. If a prediction is found to exist for that branch instruction within BHT 130, then it is output by BHT 130 to multiplexer 121. Also, if a prediction is found to exist within BHT 130 for that branch instruction, then global history 140 is also queried for the presence of absence of a prediction corresponding to the branch pattern history leading up to that branch instruction. If a prediction is found to exist for that branch pattern history within global history 140, then it is output by global history 140 to multiplexer 121. Multiplexer 121 selects a prediction to override the implied prediction of the trace to which that branch instruction belongs based on a "partial dominance" algorithm in which different predictions are given priority. Specifically, if the check of BHT 130 for a prediction for that branch instruction reveals that there is no such prediction present within BHT 130, then the implied prediction of the trace in which that branch instruction exists is used by execution engine 120. Alternatively, if the check of BHT 130 for a prediction for that branch instruction reveals that there is a corresponding prediction, and the check of global history 140 triggered by the finding of such a prediction in BHT 130 reveals no corresponding prediction in global history 140 for the pattern of branching history leading to that branch instruction, then the prediction provided by BHT 130 is used. However, if the check of BHT 130 for a corresponding prediction reveals that such a prediction is present in BHT 130, and the check of global history 140 triggered by the finding of that prediction in BHT 130 reveals that there is also a corresponding prediction in global history 140, then the prediction provided by global history 140 is used. In essence, a corresponding prediction found to exist within global history 140 is given precedence over a corresponding prediction found to exist within BHT 130, which is in turn, given precedence over the implied prediction embedded within a trace. However, as those skilled in the art of branch prediction will recognize, multiplexer 121 could be operated according to other possible rules for selecting predictions, or multiplexer 121 could be entirely replaced by other logic that derives a prediction from comparisons of differing predictions or other algorithms.

Regardless of how the predictions received by multiplexer 121 are chosen, or regardless of whether alternate logic in place of multiplexer 121 performs a different function, such as derive a prediction result from a comparison process, various events between trace cache 110 and execution engine 120 occur in response to a prediction that differs from an implied prediction of a trace being read out of a trace cache. In some embodiments, queue 114 is interposed between trace cache 110 and execution engine 120 that receives full traces from trace cache 110, but may provide only a portion of a trace to execution engine 120 if a prediction is received from multiplexer 121 that a prediction shows that execution will not follow that trace all the way to the last instruction within that trace. In such embodiments, queue 114 may pass on predictions and/or signals related to predictions received from multiplexer 121. In other embodiments, there may or may not be a queue 114, and trace cache 110 receives predictions directly from multiplexer 121 to determine whether all or only part of a trace is to be read out. In still other embodiments, there may or may not be a queue 114, and execution engine 120 receives predictions directly from multiplexer 121 to determine whether or not to flush one or more instructions from a trace that is predicted to not be followed to the last instruction within that trace. As those skilled in the art will readily appreciate, the exact way in which trace cache 110 and execution engine 120 may receive and/or respond to predictions from BHT 130 and/or global history 140 (as well as from other sources) is the subject of a wide variety of possible implementations.

If a misprediction occurs, then an entry for the mispredicted branch is created in BHT 130 (if such an entry was not already present), and data is placed within that entry of whether the mispredicted branch was actually taken or not taken. As previously alluded to, in some embodiments, this placing of data within that entry may entail incrementing or decrementing a 2-bit saturating counter, such as saturating counter 132.

Global history 140 records a histories of the patterns of branching leading up to branch instructions. As those skilled in the art of branch prediction will recognize, in various possible embodiments, this storage could be implemented by a simple indexed table, or by a cache-type array employing some form of indexing, tags and replacement algorithm, or by other storage configurations. As an example for purposes of discussion, global history 140 is depicted as a cache-type array with latch 138 supplying a stew value received from multiplexer 137 in which some of the bits of the stew value are used as an index to select a cache line and some bits are used as tag bits to select a set within a cache line (presuming that global history 140 is implemented as a multi-way set-associative cache-type array).

As previously discussed, BHT 130 may be designed with an appropriate number of entries to accommodate storing predictions only for a nominal quantity of branch instructions in which a misprediction has occurred. The exact quantity of entries may be determined through consideration and evaluation of any number of factors from characteristics of software to be executed, to the characteristics of the instruction set, to the availability of gates and/or transistors to provide entries, etc., as those skilled in the art of dynamic branch prediction hardware will readily recognize. For example, BHT 130 could be implemented as a form of cache system with a least-recently-used (LRU) or other replacement algorithm to make way for newer entries. Indeed, the replacement algorithm may employ logic to prioritize entries for being cleared more quickly if, for instance, the implied predictions in trace cache 110 later prove to be correct such that entries in BHT 130 for corresponding branch instructions are no longer needed to correct those implied predictions.

Presuming that the quantity of entries within BHT 130 is so limited, then it is likely that BHT 130 will not have entries for all branch instructions in any given trace in which multiple branch instructions exist. Therefore, as part of generating a stew value based on predictions within BHT 130, BHT 130 is provided with fill-in logic 134 which has access to data from within trace cache 110 and/or other data to fill in branch pattern history data for branch instructions for which BHT 130 does not have an entry. Therefore, fill-in logic 134 allows BHT 130 to provide a stew value (through stew logic 136) based on a complete branch history, and therefore valid enough to be used interchangeably alongside those provided directly from trace cache 110 (through stew logic 116) and/or from retirement logic 122 (through stew logic 126). However, fill-in logic 134 requires time to use data from within trace cache 110 and/or other data to create complete branch histories for whole traces from the combination of branch predictions within BHT 130 and data from other locations. Waiting for fill-in logic 134 to perform its function and provide a useable stew value through stew logic 136 to global history 140 may take enough time that the speed of execution of instructions by execution engine 120 may be effected as execution engine 120 is compelled to wait for the delayed receipt of a prediction from global history 140. To compensate for this sluggishness of fill-in logic 134, global history 140 is provided with variation logic 144 which receives a stew value corresponding to the first instruction of a trace (what is often called the "trace head"), and then uses an algorithm to repeatably modify that stew value to generate stew-like values for branch instructions at found at locations after the trace head.

Therefore, in normal operation, as each new trace begins to be read out of trace cache 110, a stew value is generated from trace cache 110 and through stew logic 116 that corresponds to the head of that new trace and the first branch instruction found within that trace. This stew value is latched within latch 138, and except under two conditions to be discussed, below, that stew value remains unchanged within latch 138 throughout the duration of the reading out of that trace from trace cache 110. Global history 140 provides predictions for branches in that trace that correspond to branch histories for which global history 140 has an entry as those branches are read out of trace cache 110, with the first prediction derived from the entry in global history 140 that is pointed to by the stew value received from trace cache 110. To select entries for subsequent branch instructions in the trace being read out from trace cache 110, variation logic 144 performs a function that repeatably modifies the unchanging stew value provided by latch 138. "Repeatably" should be taken to mean that the results of the function can be consistently repeated given the same unchanging stew value as a starting point at some later time. This function may be as simple as incrementing the unchanging stew value provided by latch 138. Alternatively, the function may be any of a variety of possible functions that ultimately results in the spreading out of predictions among entries within global history 140 so as to minimize occurrences of "interference" between predictions where predictions for different branch instructions are caused to compete for the same entries, as those skilled in the art of dynamic branch prediction will understand.

As just mentioned, in normal operation, a stew value is generated from trace cache 110 through stew logic 116 when a new trace begins to be read out from trace cache 110, and that normally, this value is latched within latch 138 and does not change throughout the reading out of the entire trace from trace cache 110, except under two certain conditions.

One of those two conditions is if the earlier described checking for entries within BHT 130 for branch instructions within that trace being read out reveals that an entry does exist for a given branch instruction being read out from trace cache 110. As discussed, earlier, in some embodiments, BHT 130 maintains entries only where the implied prediction of a trace in trace cache 110 for a particular branch has proven to differ from actual execution. Under this condition, a stew value generated from that entry in BHT 130 and other data used by fill-in logic 134 is loaded into latch 138, replacing whatever stew value was there. This is done, again, as part of the same partial dominance that leads to a prediction within BHT 130 having precedence over an implied prediction within trace cache 110, based on the probability that the prediction within BHT 130 is more accurate. Presuming that the prediction from BHT 130 is more accurate, the reading out of instructions for that trace is stopped, the reading out of a different trace must begin, and the stew value provided by BHT 130 in cooperation with fill-in logic 134 corresponds to the head of the different trace. This stew value from BHT 130 is then latched by latch 138, and just as in the case of a trace value provided by trace cache 110, this trace value does not change during the reading out of the remainder of the different trace being read out from trace cache 110, except under the same conditions that would permit a stew generated from trace cache 110 to change. This new stew value is used to access the entry for the branch history corresponding to the instruction for which BHT 130 had a prediction. From then on, for subsequent branch instructions in the same trace, variation logic 144 performs the same function, again, to repeatably modify the new unchanging stew value held within latch 138.

The other of the two conditions underwhich a stew value in latch 138 would change during the reading out of a trace, is if a branch misprediction occurs. In the event of a misprediction of a branch, a stew value is generated by retirement logic 122 and through stew logic 126 from data concerning the actual taking or not taking of branches during execution. This stew value is latched within latch 138 and is used to provide or update an entry within global history 140 for the mispredicted branch instruction. This occurs at the same time that an entry is created or updated within BHT 130, as previously discussed. If the same branch instruction is encountered again, then BHT 130 may be able to provide a prediction with a higher probability of avoiding another misprediction, or global history 140 may be able to provide a prediction with a still higher probability of accuracy if the same pattern of branching precedes that same branch instruction.

In the parlance of those skilled in the art of dynamic branch prediction, the normal operation of some embodiments of CPU logic 100 entails toggling between two different algorithms to generate stew values by which entries in global history 140 corresponding to histories of branching leading up to branch instructions in global history 140 are accessed. As each trace begins to be read out of trace cache 110, a stew value created using an algorithm based on the history of branches taken and not taken is supplied to global history 140. However, as each trace continues to be read out and as branch instructions beyond a first branch instruction is encountered in a given trace, then one or more alternate stews are created by variation logic 144 using an algorithm that provides repeatable variations of the stew supplied at the beginning of the reading out of the trace.

More precisely, in some of these embodiments, as each trace begins to be read from trace cache 110, a stew value corresponding to the first branch instruction that may be found in that trace is supplied to use in accessing an entry in global history 140. Unless there is a misprediction found in trace cache 110 or an alternate prediction that may be deemed more accurate than an implied prediction in the trace being read out, the stew value is supplied from trace cache 110. Otherwise, depending on circumstances and/or possible algorithms, the stew value is supplied from either BHT 130 or retirement logic 122. The provision of the stew value by a source other than trace cache 110 usually means that further reading out of the trace being read out will be stopped, and the reading out of a different trace that corresponds to the stew supplied by logic other than trace cache 110 will begin. Regardless of which logic provides the stew value, it is latched by latch 138 and does not change throughout the time that the trace corresponding to that stew value continues to be read out. However, it may be that one or more mechanisms by which a stew value is provided that corresponds to the beginning of the reading out of a trace is unable to provide stew values for every branch encountered in a given trace within one or more time constraints, and so, while a given trace continues to be read and multiple branch instructions are encountered, variations of the stew value latched by latch 138 are created by variation logic 144 using an algorithm that will repeatably produce the same variations of that stew value should that same stew value again be latched by latch 138 at some later time. This allows multiple entries within global history 140 to be used in support of what may be multiple branches within a given trace, thereby avoiding interference between branch histories for each of those branches within that given trace.

Figure 2:
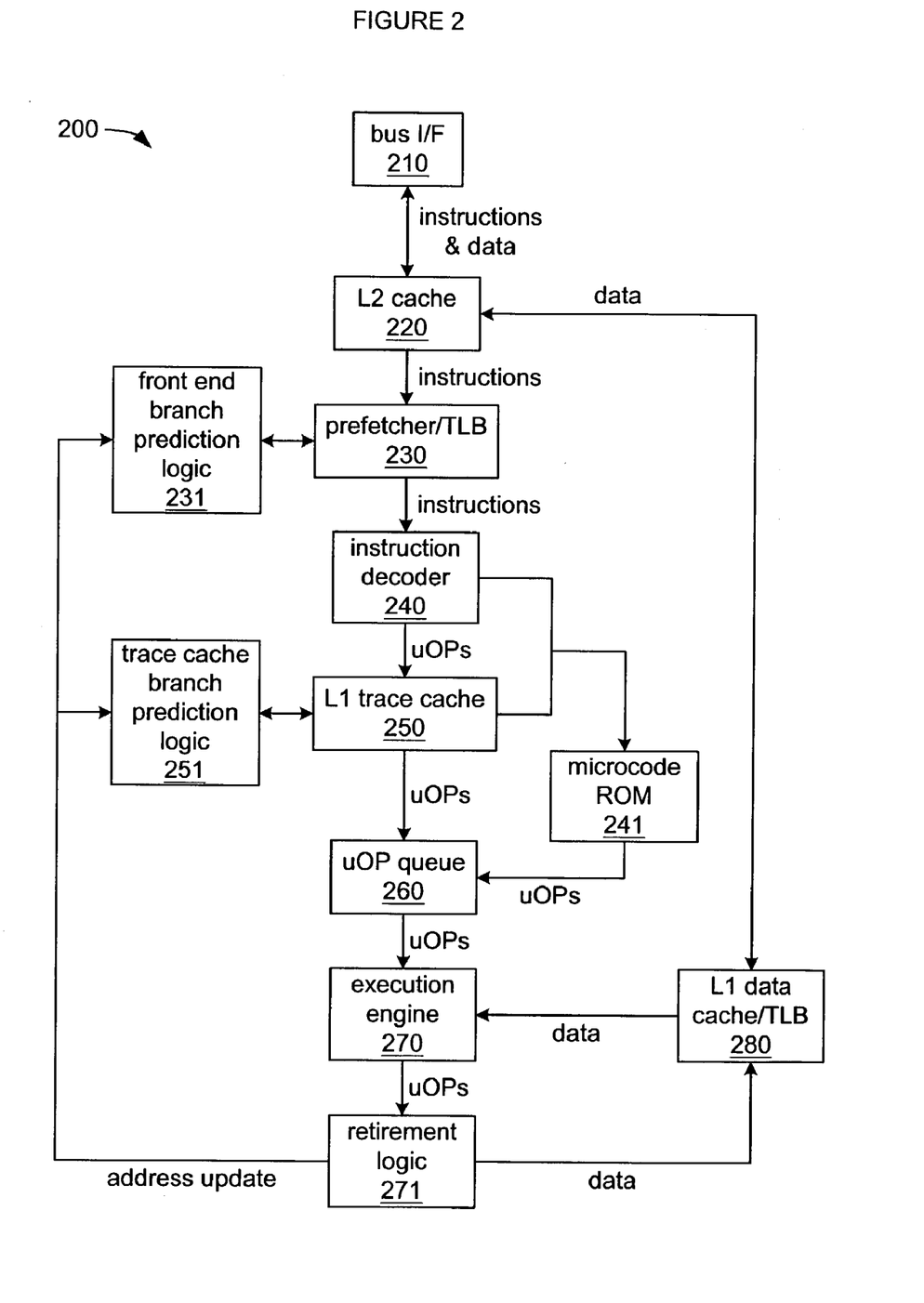
FIG. 2 depicts and embodiment of CPU architecture.

FIG. 2 depicts an embodiment of central processing unit architecture. CPU 200 is made up of bus interface 210, L2 cache 220, prefetcher/TLB 230, front end branch prediction logic 231, instruction decoder 240, microcode ROM 141, L1 trace cache 250, trace cache prediction logic 251, micro-op queue 260, execution engine 270, retirement logic 271 and L1 data cache/TLB 280. These parts of CPU 200 cooperate together to fetch, decode and execute instructions making up pieces of software.

Bus interface 210 provides an interface between portions of CPU 200 and devices outside CPU 200, such as memory devices, I/O interfaces, other CPUs, etc. Bus interface 210 is coupled to L2 cache 220, and through bus interface 210, instructions and data are exchanged between L2 cache 220 and devices external to CPU 200. L2 cache 220, in turn, is coupled to prefetcher/TLB 230, to which L2 cache 220 provides instructions, and to L1 data cache/TLB 280, with which L2 cache 220 exchanges data.

Prefetcher/TLB 230 is made up of both prefetching logic to direct the prefetching of instructions into L2 cache 220 via bus interface 210, and a TLB (translation lookaside buffer). The TLB translates between linear addresses used by software to virtualize memory address locations of instructions and corresponding physical addresses of memory storage locations in memory devices external to CPU 200 where such instructions are actually stored. Prefetcher/TLB 230 is coupled with and makes use of front end branch prediction logic 231 to determine from what memory address locations in external memory devices should instructions next be loaded into L2 cache 220 so that such data and instructions are more speedily available for use by other parts of CPU 200. In numerous possible variations of embodiments of CPU 200, front end branch prediction logic 231 may employ any of a number of static and/or dynamic branch prediction algorithms to predict whether or not branches found in instructions received from L2 cache 220 will be taken or not taken in determining the next memory address locations from which further instructions should be loaded. Prefetcher/TLB 230 is further coupled with and provides instructions to instruction decoder 240.

Instruction decoder 240 decodes more complex instructions received from prefetcher/TLB 230 into simpler instructions called micro-ops. Depending on the instruction set of a given embodiment, the instructions caused to be prefetched by prefetcher/TLB 230 may be of varying length and complexity (depending on the instruction set of any given embodiment of CPU 200), the micro-ops provided by instruction decoder 240 are generally of the same length and complexity. Alternate embodiments may employ an instruction set in which most or all of the instructions are of the same length and/or are of similar complexity. Indeed, in some embodiments, particularly RISC embodiments, the instructions may be of sufficient simplicity that their conversion to micro-ops may be deemed unnecessary. Instruction decoder 240 is coupled to L1 trace cache 250 and provides L1 trace cache 250 with micro-ops which L1 trace cache 250 stores in one or more trace cache lines.

L1 trace cache 250 is coupled with and makes use of trace cache branch prediction logic 251 to predict whether or not branches found in micro-ops received from instruction decoder 240 will be taken or not taken in determining which other micro-ops should be assembled together as traces and stored within L1 trace cache 250. L1 trace cache 250 stores micro-ops received from instruction decoder 240 in small groups called traces in which the micro-ops are stored in the order in which the predictions made by trace cache branch prediction logic 251 suggest they will be executed, while dropping micro-ops that the predictions suggest will not be executed. The fact that micro-ops are stored in an order in which branch prediction logic 251 suggests they will be executed necessarily means that traces stored within trace cache 250 provide implied indications of predictions made by branch prediction logic 251. Presuming that such predictions prove correct, the storing of only the micro-ops that are to -be executed ensures that space within L1 trace cache 250 is not wasted by storing micro-ops that will not be executed, and that L1 trace cache 250 will be able to supply an unbroken stream of the micro-ops in the correct order in which they will be needed for execution.

In making the predictions that determine what instructions are assembled together in each trace, branch prediction logic 251 may be made up of a plurality of prediction mechanisms based on a variety of prediction algorithms, including bi-modal algorithms (such as Lee & Smith, among others), various BHTs and/or branch target buffers (BTBs), pattern history registers and/or pattern history tables (PHTs), etc. These differing prediction algorithms, may necessitate the passing of indices and/or stew values between logic implementing different prediction algorithms, and issues of the speed of logic used in providing such indices and/or stew values may necessitate the provision of variation logic, such as was discussed with regard to FIG. 1 in order to allow a desired rate of execution of instructions.

Micro-op queue 260 is coupled to and receives from L1 trace cache 250 the unbroken stream of micro-ops derived from the decoding of instructions carried out by instruction decoder 240. In some embodiments, the architecture of CPU 200 may be optimized such that a subset of the instructions making up the instruction set of CPU 200 are deemed either to be used so infrequently and/or to be so complex that providing dedicated circuitry within instruction decoder 240 to decode this subset of instructions may be deemed undesirable. For such a subset of instructions, microcode ROM 241 may be provided to decode this subset of instructions received from instruction decoder 240, despite the likelihood that microcode ROM 241 will be slower than the circuitry of instruction decoder 240. Microcode ROM 241, in coordination with L1 trace cache 250, would then provide the micro-ops decoded from this subset of instructions in the order in which they are to be executed to micro-op queue 260 where the micro-ops from both L1 trace cache 250 and microcode ROM 241 are combined and queued to be provided in the order of execution to execution engine 270, to which micro-op queue is also coupled.

Execution engine 270 executes the micro-ops received from micro-op queue 260. In executing such micro-ops, execution engine 270 is also coupled to and receives from L1 data cache/TLB 280 the data required to carry out the execution of such micro-ops. In various possible embodiments of CPU 200, the logic within execution engine 270 may provide one or more of any of a number of possible portions of execution circuitry, including, but not limited to arithmetic logic units (commonly referred to as ALUs), floating-point arithmetic units (commonly referred to as FPUs), processing units for single-instruction-multiple-data (SIMD) operations, load/store processing units, etc. Also, in various embodiments of CPU 200, the logic within execution engine 270 may seek to achieve instruction level parallelism and/or mitigate the loss of performance from delays caused by stalled micro-ops by executing micro-ops received from micro-op queue 260 out of order (what is often referred to as out-of-order execution). In such embodiments, execution engine 270 may be coupled to a form of retirement logic 271 where micro-ops and/or the outputs of micro-ops for which execution is complete are temporarily held until preceding micro-ops have also been executed. In essence, retirement logic 271 would ensure that the results of executed micro-ops are put back in order after their out-of-order execution. With this putting back of results into order having been accomplished for a given sequence of micro-ops, any outputs to memory are transferred from retirement logic 271 to L1 data cache/TLB 280 to which retirement logic 171 is further coupled.

L1 data cache/TLB 280 is made up of both an level 1 data cache to store and provide speedier access of data, and a TLB to translate between linear addresses used by software to virtualize memory address locations of data (rather than instructions) and corresponding physical addresses of memory storage locations in memory devices external to CPU 200 where such data are actually stored. L1 data cache/TLB 280 is further coupled to L2 cache 220. Execution engine 270 requests data needed in the execution of micro-ops from L1 data cache/TLB 280, which will supply the requested data if it is present within L1 data cache/TLB 280. Otherwise, L1 data cache/TLB 280 will request the data from L2 cache 220, which will supply the requested data if it is present within L2 cache 220. Otherwise, L2 cache 220 will, in turn, request the data from external memory devices through bus interface 210. In some embodiments of CPU 200, L1 data cache/TLB 280 may be of a write-through configuration, meaning that when data is written to L1 data cache/TLB 280 by retirement logic 270, L1 data cache/TLB 280 will both store that data and pass it on to L2 cache 220 to also be stored, there.

With regard to both FIGS. 1 and 2, the reason for the use of a variation logic in creating the equivalent of subsequent indices and/or stew values was to compensate for an inability for one form of prediction logic to supply such values quickly enough to be used by other prediction logic to supply predictions quickly enough to avoid stalling the execution of instructions. However, such variation logic may also be used to compensate for the inability of a trace cache to provide such values quickly enough, or may be used to reduce costs and/or complexity by maintaining the simplicity of design of a given portion of prediction logic and/or trace cache by not requiring support for supplying such values under such time constraints. Regardless of the precise reason for the inability to provide such values either quickly enough, or at all, a form of variation logic that uses what such values are available as a base for repeatable variations of such values can be used to achieve the level of non-interference between stored predictions needed to make a mechanism of prediction more effective.

Figure 3A:
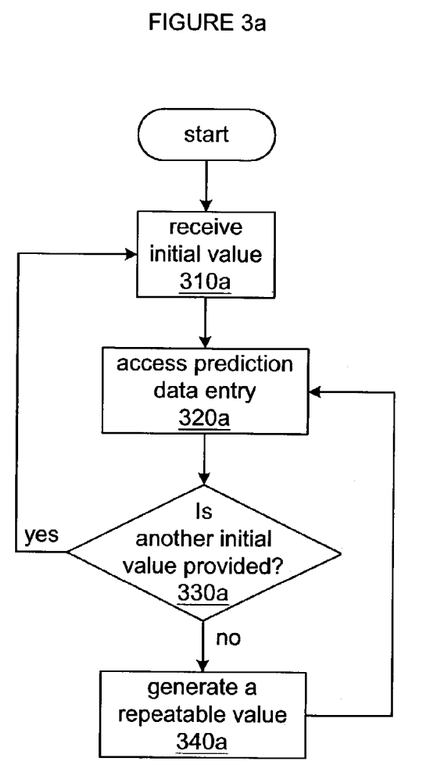
FIGS. 3a and 3b depicts flowcharts of embodiments.
Figure 3B:
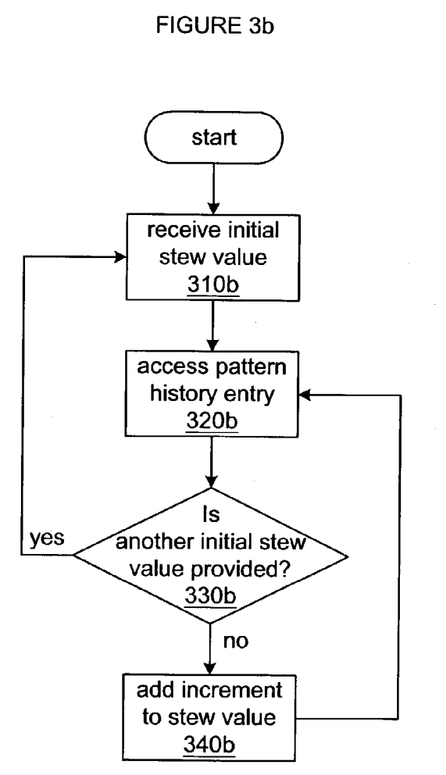

FIGS. 3a and 3b depict a flow charts detailing embodiments of approaches to storing and retrieving data for branch prediction. At 310a, an initial value is received to be used in retrieving prediction data, and correspondingly, an initial stew value is received at 310b. In some embodiments, the data could be stored in an indexed array, such as branch history data in a branch history table, and the initial value could then be an instruction pointer value from which at least some bits might be used as an index into the array. In other embodiments, the data could be stored in a cache-like array, such as branch pattern history data in a pattern history table, and the initial value could be comprised of bits representing the history of a quantity of recent branches, or bits forming a stew value created by any of a number of algorithms combining bits representing the history of a quantity of adjacent branches and bits from an instruction pointer or other index pointing to a given branch instruction. At 320a and 320b, the values, whether initial values or not, is used to access prediction data, such as branch history, branch pattern history, etc. At 330a, a check is made as to whether or not another initial value has been provided, and correspondingly, a check is made as to whether or not an initial stew value has been provided at 320b. If so, then at 310a, the new initial value is received, and if not, then at 340a, a new and repeatable value is generated through a repeatable algorithm using the initial value as the basis for generating the repeatable value. Correspondingly, if a new initial stew value was received, then at 310b, the new initial stew value is received, but if no new initial stew value was received, then at 340b, an incremental value is added to the stew value last received to create an alternate stew value or "stew-like" value. FIG. 3b depicts that for some embodiments, the generation of an alternate stew value with a repeatable function could be as simple as repeatedly adding a constant to the initial value. In other embodiments, as depicted in FIG. 3a, a different and/or more complex algorithm may be used. Regardless of whether a new initial value is received or a new value is generated, prediction data is once again accessed at 320a and 320b using new values, and the process repeats.

Figure 4:
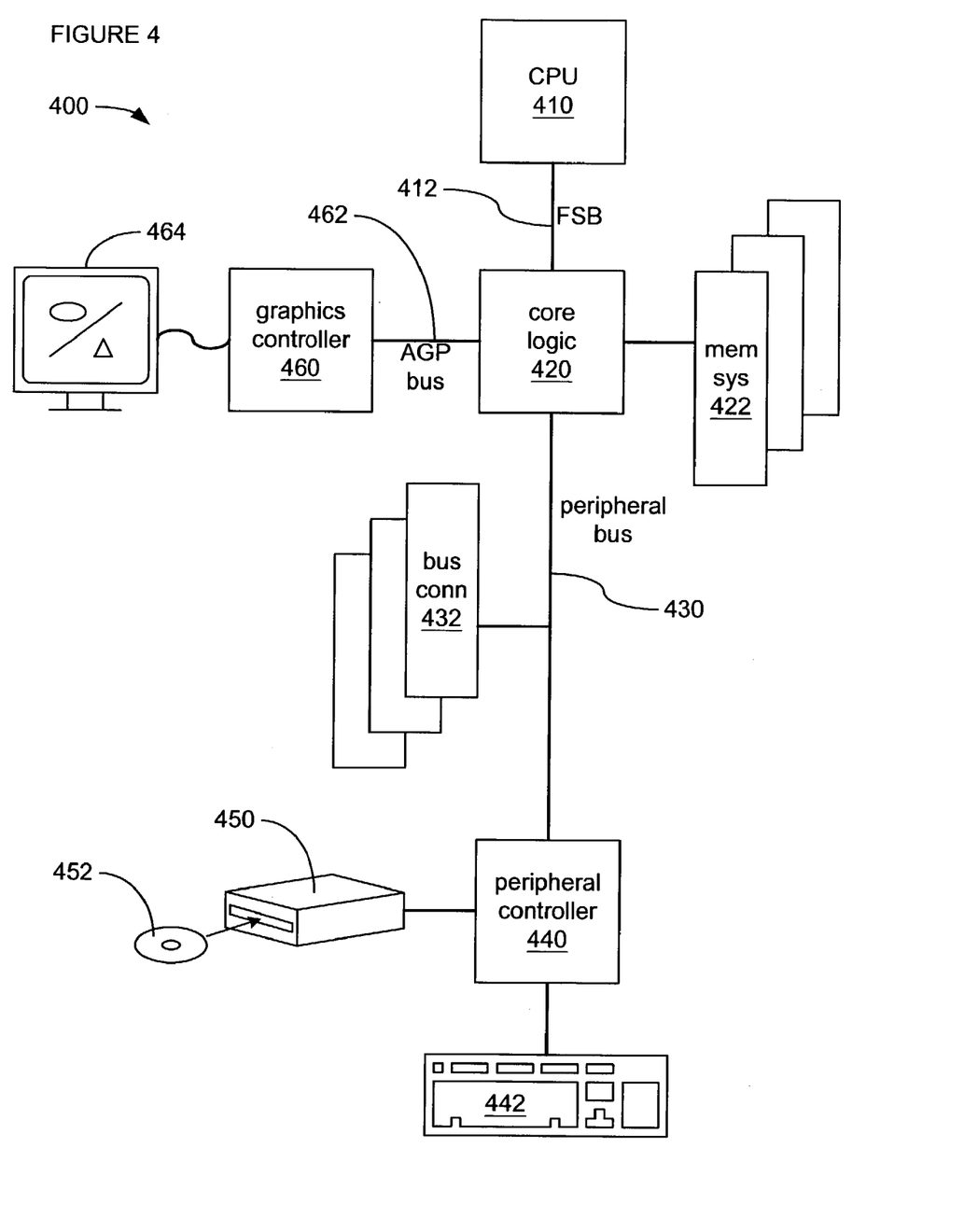
FIG. 4 depicts an embodiment of a computer system.

FIG. 4 depicts an embodiment of a computer system. Computer system 400 is made up of CPU 410, front side bus (FSB) 412, core logic 420, memory system 422, peripheral bus 430, peripheral controller 440 and storage device 450. These parts of computer system 400 cooperate together to fetch, decode and execute instructions making up pieces of software, and in some embodiments, those instructions may be provided to computer system 400 via storage media 452. Various embodiments of computer system 400 may also be made up of bus connectors 432, input device 442, graphics controller 460, advanced graphics port (AGP) bus 462 and/or display 464.

CPU 410, in a manner similar to embodiments described, above, in reference to FIGS. 1, 2, 3a and 3b, fetches and employs a global history (similar to global history 140 of FIG. 1) with stews generated by two different algorithms, as discussed at length, above. CPU 410 is coupled via FSB 412 to core logic 420 which is in turn coupled to memory system 422 and to peripheral bus 430. Through peripheral bus 430, core logic 420 is further coupled to peripheral controller 440, which is in turn, coupled to storage device 450. Storage device 450 provides computer system 400 (including CPU 410) with access to data carried by storage media 452. Storage device 450 and accompanying storage media 452 may be based on any of a wide variety of possible storage technologies including, but not limited to computer readable or accessible storage mediums such as: magnetic, magneto-optical, photochemical, and/or perforations in paper etc.; or paper storage mediums such as glyphs etc. Although storage media 452 is depicted in a manner that suggests the ability to be removed from storage device 450, those skilled in the art will readily appreciate that in various embodiments, storage media 452 may be of a type that is meant to be permanently installed within storage device 450, in the sense that a user of computer system 400 cannot simply "eject" storage media 452 from storage device 450.

As previously mentioned, various embodiments of computer system 400 may also be made up of input device 442, such as a keyboard, mouse, etc. Also, various embodiments of computers system 400 may also be made up of bus connectors 432 by which various devices may be coupled to peripheral bus 430 to add to augment the functionality of computer system 400. Furthermore, various embodiments of computer system 400 may also be made up of graphics controller 460 coupled to the rest of computers system 400 via AGP bus 462, and/or display 464.

In some embodiments, storage media 452 may carry instructions to be executed by an execution engine within CPU 410. In other embodiments, storage media 452 may carry instructions to be executed by a microcontroller or other form of logic within CPU 410 to control at least one form of stew algorithm and/or at least one form of branch prediction. Also, to achieve speedy access by CPU 410 to instructions carried by storage media 452, instructions may first be copied from storage media 452 and into memory system 422. Finally, although storage device 450 is depicted as being coupled to the rest of computers system 400 via peripheral controller 440, those skilled in the art will readily recognize that in various embodiments, storage device 450 may be coupled to computer system 400 in any of a number of possible ways.

As those skilled in the art of branch prediction will recognize, referring to the various aforedescribed embodiments, the number and varieties of branch prediction employed may be varied form the example embodiments discussed, above, without departing from the spirit and scope of the invention as hereinafter claimed. Also, although a form of variation logic employing an algorithm of incrementing of indices and/or stew values has been described, those skilled in the art will recognize that any algorithm that achieves a reduction of interference between stored pattern histories in particular, and predictions, more generally, may be employed without departing from the spirit and scope of the invention as hereinafter claimed.

What is claimed is:

1. An apparatus comprising:
   a global history in which branch patterns of branches taken and not taken are stored;
   a first stew logic having a first stew algorithm for creating a first stew; and
   a second stew logic having a second stew algorithm for creating a second stew, wherein the global history repeatedly toggles between accessing entries with stews from the first stew logic and accessing entries with stews from the second stew logic.

2. The apparatus of claim 1, wherein entries corresponding to stored branch patterns are organized in a cache-like array and accessed using some bits comprising a stew as tag bits, and other bits comprising a stew as index bits.

3. The apparatus of claim 1, further comprising a trace cache, wherein the global history accesses an entry with a stew from the first stew logic when a trace begins to be read out of the trace cache, and wherein the global history accesses an entry with a stew from the second stew logic if there is a plurality of branch instructions within the trace and at least a second branch instruction is read out of the trace cache.

4. The apparatus of claim 1, wherein the second stew algorithm of the second stew logic entails making at least one variation of a stew created by the first stew logic in a manner that is repeatable.

5. The apparatus of claim 4, wherein the second stew algorithm of the second stew logic entails repeatedly adding a constant value to a stew created by the first stew logic.

6. An apparatus comprising:
an execution engine;
a trace cache reading out traces of instructions stored within the trace cache to be supplied to the execution engine;
a global history in which branch patterns of branches taken and not taken are stored;
a first stew logic supplying to the global history a first stew created from the branch patterns of branches taken and not taken as indicated by the branch predictions implied by the ordering of instructions within the traces stored within the trace cache; and
a variation logic creating and supplying to the global history a second stew from the first stew by way of a repeatable algorithm.

7. The apparatus of claim 6, wherein partial dominance between predictions is employed such that a prediction implied by the ordering of instructions within a trace stored within the trace cache is used for a given branch instruction unless there is a prediction found to exist within the global history that corresponds to the branch pattern history leading up to that branch instruction.

8. The apparatus of claim 6, wherein the global history accesses an entry within the global history with a stew supplied by the first stew logic when a trace begins to be read out of the trace cache, and wherein the global history accesses an entry within the global history with a stew supplied by the variation logic when there is a plurality of branch instructions in a given trace and at least a second branch instruction is read out of the trace cache.

9. The apparatus of claim 6, further comprising a second stew logic supplying to the global history a third stew created from the actual branch patterns of branches taken and not taken during the execution of instructions by the execution engine, and wherein an entry within the global history is accessed with a stew supplied by the second stew logic when a misprediction occurs.

10. The apparatus of claim 6, further comprising: a branch history table; and a second stew logic supplying to the global history a third stew created from the branch patterns of branches taken and not taken as indicated by the branch predictions provided by the branch history table.

11. The apparatus of claim 10, wherein the branch history table has entries only for branch instructions where a prediction implied by the ordering of instructions within a trace within the trace cache for those branch instructions proved to be a misprediction at least once when those branch instructions were actually executed by the execution engine.

12. The apparatus of claim 11, wherein partial dominance between predictions is employed such that a prediction implied by the ordering of instructions within a trace stored within the trace cache is used for a given branch instruction unless there is a prediction found to exist for that branch instruction within the branch history table, in which case, the prediction found within the branch history table is used for the given branch instruction unless a prediction is found to exist within the global history that corresponds to the branch pattern history leading up to that branch instruction.

13. A method comprising:
creating a first stew from the branch patterns of branches to be taken and not taken as indicated by the branch predictions implied by the ordering of instructions within the traces stored within a trace cache;
creating a second stew from a repeatable variation of the first stew;
accessing an entry within a global history with the first stew when a trace is read out of a trace cache; and
accessing an entry within the global history with the second stew when there is a plurality of branch instructions within a trace within the trace cache, and at least a second branch instruction within that trace has been read out.

14. The method of claim 13, further comprising supplying an execution engine with a whole trace read out of the trace cache unless a prediction is found to exist within the global history that corresponds to the branch pattern history leading up to the branch instruction within the trace.

15. The method of claim 13, further comprising supplying an execution engine with a whole trace read out of the trace cache unless a prediction is found to exist within a branch history table for the branch instruction within the trace.

16. The method of claim 13, further comprising: creating a third stew from the branch patterns of the actual branches taken and not taken during execution of instructions by an execution engine; and accessing an entry within the global history with the third stew when a prediction implied by the ordering of instructions within a trace read out of the trace cache proves to be a misprediction.

17. The method of claim 13, wherein creating the second stew from a repeatable variation of the first stew entails repeatedly adding a constant value to the first stew.

18. A machine-accessible medium comprising code that when executed by a processing device within an electronic device, causes the electronic device to:
create a first stew from the branch patterns of branches to be taken and not taken as indicated by the branch predictions implied by the ordering of instructions within the traces stored within a trace cache;
create a second stew from a repeatable variation of the first stew;
access an entry within a global history with the first stew when a trace is read out of a trace cache; and
access an entry within the global history with the second stew when there is a plurality of branch instructions within a trace within the trace cache, and at least a second branch instruction within that trace has been read out.

19. The machine-accessible medium of claim 18, wherein the repeatable variation of the first stew is created by adding a constant value to the first stew.

* * * * *

UNITED STATES PATENT AND TRADEMARK OFFICE
CERTIFICATE OF CORRECTION

| | | |
|---|---|---|
| PATENT NO. | : 7,143,273 B2 | Page 1 of 1 |
| APPLICATION NO. | : 10/404812 | |
| DATED | : November 28, 2006 | |
| INVENTOR(S) | : Miller et al. | |

It is certified that error appears in the above-identified patent and that said Letters Patent is hereby corrected as shown below:

In column 1, at line 32, delete "and" and insert --an--.
In column 12, at line 50, delete "form" and insert --from--.

Signed and Sealed this

Sixth Day of November, 2007

JON W. DUDAS
*Director of the United States Patent and Trademark Office*